US012803259B2

(12) United States Patent
Isoda et al.

(10) Patent No.: US 12,803,259 B2
(45) Date of Patent: Nov. 17, 2026

(54) WIRE MOVABLE PATH REGULATING COMPONENT AND PATH REGULATING WIRE HARNESS

(71) Applicant: SUMITOMO WIRING SYSTEMS, LTD., Yokkaichi (JP)

(72) Inventors: Kazuma Isoda, Yokkaichi (JP); Hiroki Uno, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 196 days.

(21) Appl. No.: 18/847,774

(22) PCT Filed: Mar. 15, 2023

(86) PCT No.: PCT/JP2023/010151
§ 371 (c)(1),
(2) Date: Sep. 17, 2024

(87) PCT Pub. No.: WO2023/189615
PCT Pub. Date: Oct. 5, 2023

(65) Prior Publication Data

US 2025/0210956 A1 Jun. 26, 2025

(30) Foreign Application Priority Data

Mar. 30, 2022 (JP) ................................ 2022-055487

(51) Int. Cl.

| | |
|---|---|
| ***B60R 16/02*** | (2006.01) |
| ***H02G 3/04*** | (2006.01) |
| ***H02G 11/00*** | (2006.01) |

(52) U.S. Cl.
CPC ....... *H02G 11/006* (2013.01); *B60R 16/0215* (2013.01); *H02G 3/0437* (2013.01)

(58) Field of Classification Search
CPC .......................... H02G 11/006; B60R 16/0215
See application file for complete search history.

(56) References Cited

U.S. PATENT DOCUMENTS

| | | | |
|---|---|---|---|
| 2005/0224317 | A1 | 10/2005 | Wehler et al. |
| 2007/0289767 | A1 | 12/2007 | Blase |
| 2022/0144190 | A1 | 5/2022 | Isoda et al. |

(Continued)

FOREIGN PATENT DOCUMENTS

| | | | |
|---|---|---|---|
| JP | 2001-177945 | A | 6/2001 |
| JP | 2009-165286 | A | 7/2009 |
| JP | 2015-220790 | A | 12/2015 |

OTHER PUBLICATIONS

May 30, 2023 International Search Report issued in International Patent Application No. PCT/JP2023/010151.

*Primary Examiner* — Hung V Ngo
(74) *Attorney, Agent, or Firm* — Oliff PLC

(57) ABSTRACT

A wire movable path regulating component for regulating a movable path of at least one first wire and at least one second wire that extend between a first component and a second component movable relative to the first component, the wire movable path regulating component including: a main body configured to be coupled in a rotationally movable manner to another wire movable path regulating component; and an attachment that is a separate component from the main body and is attached to the main body.

10 Claims, 5 Drawing Sheets

(56) References Cited

U.S. PATENT DOCUMENTS

| | | | | |
|---|---|---|---|---|
| 2023/0256922 | A1* | 8/2023 | Kogure | B60R 16/0215<br>174/72 A |
| 2024/0326721 | A1* | 10/2024 | Kogure | H02G 3/04 |
| 2025/0042347 | A1* | 2/2025 | Isoda | H02G 3/04 |
| 2025/0219380 | A1* | 7/2025 | Isoda | B60R 16/0215 |

* cited by examiner

WIRE MOVABLE PATH REGULATING COMPONENT AND PATH REGULATING WIRE HARNESS

BACKGROUND

The present disclosure relates to a wire movable path regulating component and a path regulating wire harness.

JP 2020-141519A discloses a cable guide in which a plurality of tubular link frame bodies disposed in a row are coupled together in such a manner as to be rotatable relative to each other. The link frame bodies each include a main body part and a cover body and are constituted to be tubular in shape. A wire harness is housed in the coupled link frame bodies.

SUMMARY

For example, the link frame bodies themselves are assumed to be designed in accordance with a basic design for wiring in a vehicle. However, electrical wires may possibly be added after the basic design. It is thus desired to be able to readily handle the case where electrical wires are added to the basic design.

An exemplary aspect of the disclosure is to be able to readily handle addition of electrical wires.

A wire movable path regulating component of the present disclosure is a wire movable path regulating component for regulating a movable path of at least one first wire and at least one second wire that extend between a first component and a second component movable relative to the first component, the wire movable path regulating component including: a main body configured to be coupled in a rotationally movable manner to another wire movable path regulating component; and an attachment that is a separate component from the main body and is attached to the main body, wherein: the main body has a housing opening through which the at least one first wire is to be housed and a first wire housing space configured to house the at least one first wire in a state of passing therethrough inside the housing opening, the attachment has a cover main body that blocks the housing opening and an additional enclosing part forming a second wire housing space configured to house the at least one second wire in a state of passing therethrough, with the second wire housing space being partitioned from the first wire housing space by the cover main body, and the additional enclosing part includes an additional cover part openable and closable between a state in which the second wire housing space is enclosed and an open state in which at least part of the second wire housing space is open.

Also, a path regulating wire harness of the present disclosure is a path regulating wire harness including the wire movable path regulating component, the at least one first wire, and the at least one second wire, the plurality of wire movable path regulating components being coupled together in a row in such a manner as to be rotationally movable relative to each other, the at least one first wire being housed in the plurality of wire movable path regulating components in a state of passing through the first wire housing space, and the at least one second wire being housed in the plurality of wire movable path regulating components in a state of passing through the second wire housing space.

According to the present disclosure, addition of electrical wires can be readily handled.

DETAILED DESCRIPTION OF EMBODIMENTS

Description of Embodiments of Disclosure

Figure 1:
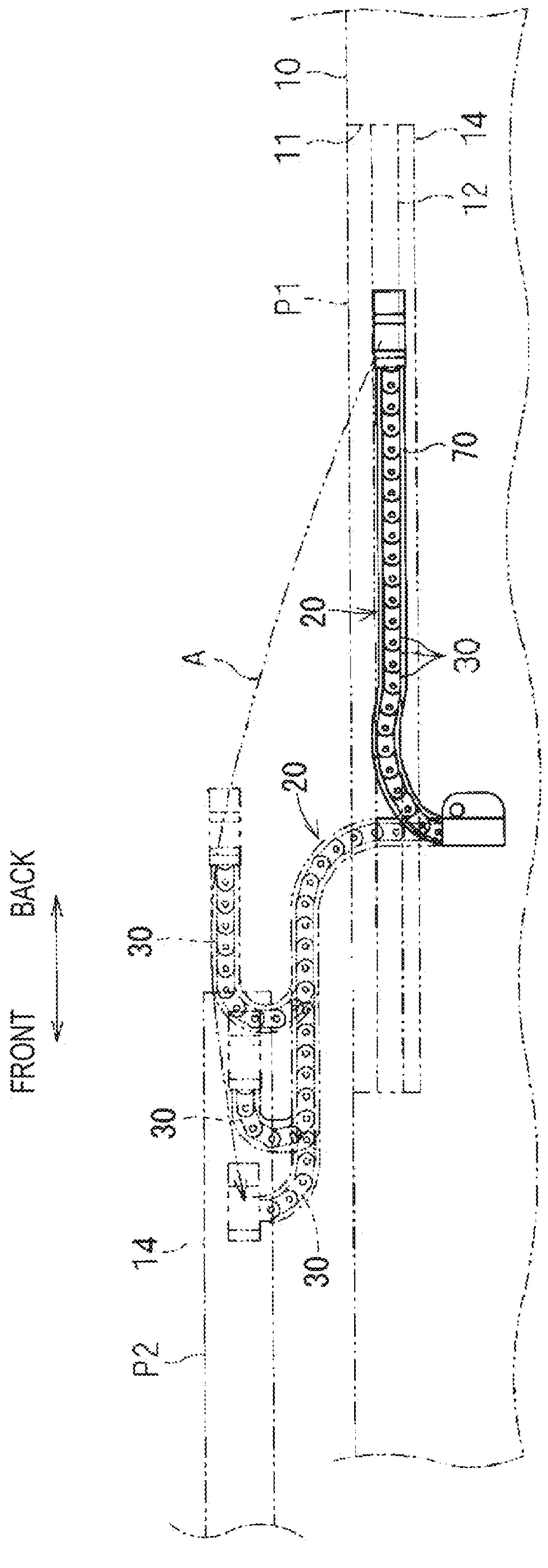
FIG. 1 is a schematic plan view showing a state in which a path regulating wire harness according to a first embodiment is arranged between a vehicle body main body and a sliding door.

Initially, modes of the present disclosure will be enumerated and described.

A wire movable path regulating component of the present disclosure is as follows.

(1) A wire movable path regulating component for regulating a movable path of at least one first wire and at least one second wire that extend between a first component and a second component movable relative to the first component, including a main body component to be coupled in a rotationally movable manner to another wire movable path regulating component, and an attachment component that is a separate component from the main body component and is attached to the main body component, the main body component having a housing opening through which the at least one first wire is housed and a first wire housing space for housing the at least one first wire in a state of passing therethrough inside the housing opening, the attachment component having a cover main body part that blocks the housing opening and an additional enclosing part forming a second wire housing space for housing the at least one second wire in a state of passing therethrough, with the second wire housing space being partitioned from the first wire housing space by the cover main body part, and the additional enclosing part including an additional cover part openable and closable between a state in which the second wire housing space is enclosed and an open state in which at least part of the second wire housing space is open.

According to this wire movable path regulating component, even if the second wire is added, the path of the first wire which is based on a basic design is regulated within the first wire housing space. The addition of the second wire is thus unlikely to affect the movement of the first wire. Also, the path of the second wire is regulated within the second wire housing space partitioned from the first wire housing space. The path of the first wire is regulated within the first wire housing space, and, separately thereto, the path of the second wire is regulated within the second wire housing space. Changes in the path lengths of the first wire and the second wire in response to changes in the paths thereof are thus reduced. Variation in the loads acting on the first wire and the second wire is thereby reduced, when the paths of the first wire and the second wire change.

Also, with the additional cover part in an open state, the at least one second wire can be readily disposed within the second wire housing space. Thereafter, by closing the additional cover part, the path of the at least one second wire can be regulated by the second wire housing space.

(2) The wire movable path regulating component according to (1), in which the attachment component may have a hinge part swingably supporting the additional cover part on one side of the additional cover part, an additional cover locking part provided on another side of the additional cover part, and an additional cover receiving-side locking part latchable to the additional cover locking part.

In this case, the additional cover locking part can be readily locked to the additional cover receiving-side locking part, by rotating the additional cover part about the hinge part and closing the additional cover part.

(3) The wire movable path regulating component according to (2), in which the hinge part may be a thin hinge part formed thinner than a pair of adjacent portions continuous with the hinge part. The hinge part can thereby be readily formed, while reducing the number of components by constituting the cover main body part and the additional enclosing part as an integrally molded component.

(4) The wire movable path regulating component according to any one of (1) to (3), in which the main body component may be more rigid than the attachment component. The strength of the wire movable path regulating component can thereby be secured by the main body component, which is more rigid than the attachment component. Also, the attachment component, which is more flexible than the main body component, is suitable for being provided with a structure for enabling the additional cover part to open and close with respect to the cover main body part and with a locking structure for keeping the additional cover part closed.

(5) The wire movable path regulating component according to any one of (1) to (4), in which the main body component may have a locking part located on both side portions of the housing opening, the cover main body part may have a lock-receiving part to which the locking part latches, and the additional enclosing part may be formed at a position where the additional enclosing part is moldable inward of the lock-receiving part. The additional enclosing part and the lock-receiving part can be readily molded.

(6) The wire movable path regulating component according to any one of (1) to (5), in which the at least one second wire housed within the second wire housing space may be fewer in number than the at least one first wire housed within the first wire housing space. In this case, the smaller number of second wires can be readily added.

(7) The wire movable path regulating component according to any one of (1) to (6), in which the attachment component may have regulating shape plane symmetry with respect to a surface orthogonal to a width direction and regulating shape plane symmetry with respect to a surface orthogonal to a through direction of the second wire housing space. Since the attachment component can be attached to the main body component without worrying about orientation, the ease of assembling the wire movable path regulating component is thereby improved.

(8) The wire movable path regulating component according to any one of (1) to (7), in which a length of the additional enclosing part in the through direction of the second wire housing space may gradually decrease proceeding away from the main body component. When the wire movable path regulating component rotates relative to another wire movable path regulating component, the additional enclosing part is thereby unlikely to interfere with the other wire movable path regulating component.

(9) The wire movable path regulating component according to any one of (1) to (8), in which a portion of the additional enclosing part on an opposite side to the main body component may be formed in an arc shape as viewed in the through direction of the second wire housing space. In this way, when the portion of the additional enclosing part on the opposite side to the main body component has an arc shape, it is easy to cover the wire movable path regulating component with an exterior component such as a rubber boot.

Also, a path regulating wire harness according to the present disclosure is as follows.

(10) A path regulating wire harness including the wire movable path regulating component according to any one of (1) to (9), the at least one first wire, and the at least one second wire, the plurality of wire movable path regulating components being coupled together in a row in such a manner as to be rotationally movable relative to each other, the at least one first wire being housed in the plurality of wire movable path regulating components in a state of passing through the first wire housing space, and the at least one second wire being housed in the plurality of wire movable path regulating components in a state of passing through the second wire housing space.

Addition of electrical wires can thereby be readily handled, and, in the path regulating wire harness, variation in the loads acting on the first wire and the second wire is reduced, when the paths of the first wire and the second wire change.

Detailed Description of Embodiments of Disclosure

Specific examples of a wire movable path regulating component and a path regulating wire harness of the present disclosure will be described below with reference to the drawings. Note that the present disclosure is not limited to these illustrative examples and is indicated by the claims, and all changes that come within the meaning and range of equivalency of the claims are intended to be embraced therein.

First Embodiment

Hereinafter, a wire movable path regulating component and a path regulating wire harness according to an embodiment will be described.

Example Application of Path Regulating Wire Harness

FIG. 1 is a schematic plan view showing a state in which a path regulating wire harness 20 is arranged between a vehicle body main body 10 and a sliding door 14. Note that, in FIG. 1, the path along which the sliding door 14 moves when the sliding door 14 is opened and closed is indicated by an arrow A. Also, the change in the state of the path regulating wire harness 20 with opening and closing of the sliding door 14 is indicated by a two-dot chain line.

The relationship between the vehicle body main body 10 and the sliding door 14 will now be described. A vehicle includes the vehicle body main body 10 and the sliding door 14 provided on one side portion of the vehicle body main body 10. A passenger entrance 11 through which people can get in and out of the vehicle is provided on the one side portion of the vehicle body main body 10. The sliding door 14 is supported in such a manner as to be movable between a position at which the passenger entrance 11 is closed (closed position P1) and a position at which the passenger entrance 11 is open (open position P2), by a slide support mechanism part that includes a guide rail 12 and a movable support part that supports the sliding door 14 in a state of being movable along the guide rail 12. In the present embodiment, the closed position P1 is located forward of the open position P2.

The sliding door 14 opens and closes the passenger entrance 11 by sliding on the side of the vehicle body main body 10. Here, the sliding door 14 displaces outward in the vehicle width direction (see arrow A) while sliding from the closed position P1 to the open position P2. The vehicle body main body 10 is an example of a first component, and the sliding door 14 is an example of a second component that moves relative to the vehicle body main body 10.

The path regulating wire harness 20 extends between a vehicle body main body 10 and a sliding door 14 such as described above. When the sliding door 14 moves relative to the vehicle body main body 10, the path regulating wire harness moves with the movement of the sliding door 14. The range of movement of the path at this time is regulated by a wire movable path regulating component 30. Interference of the path regulating wire harness 20 with the sliding door 14 or a peripheral portion of the passenger entrance 11 of the vehicle body main body 10 is thereby suppressed.

The first component and the second component between which the path regulating wire harness 20 extends are not limited to the above examples. The path regulating wire harness 20 extends between a first component and a second component that moves relative to the first component. For example, the first component may be a vehicle body (e.g., floor) and the second component may be a sliding seat.

Regarding Path Regulating Wire Harness

Figure 2:
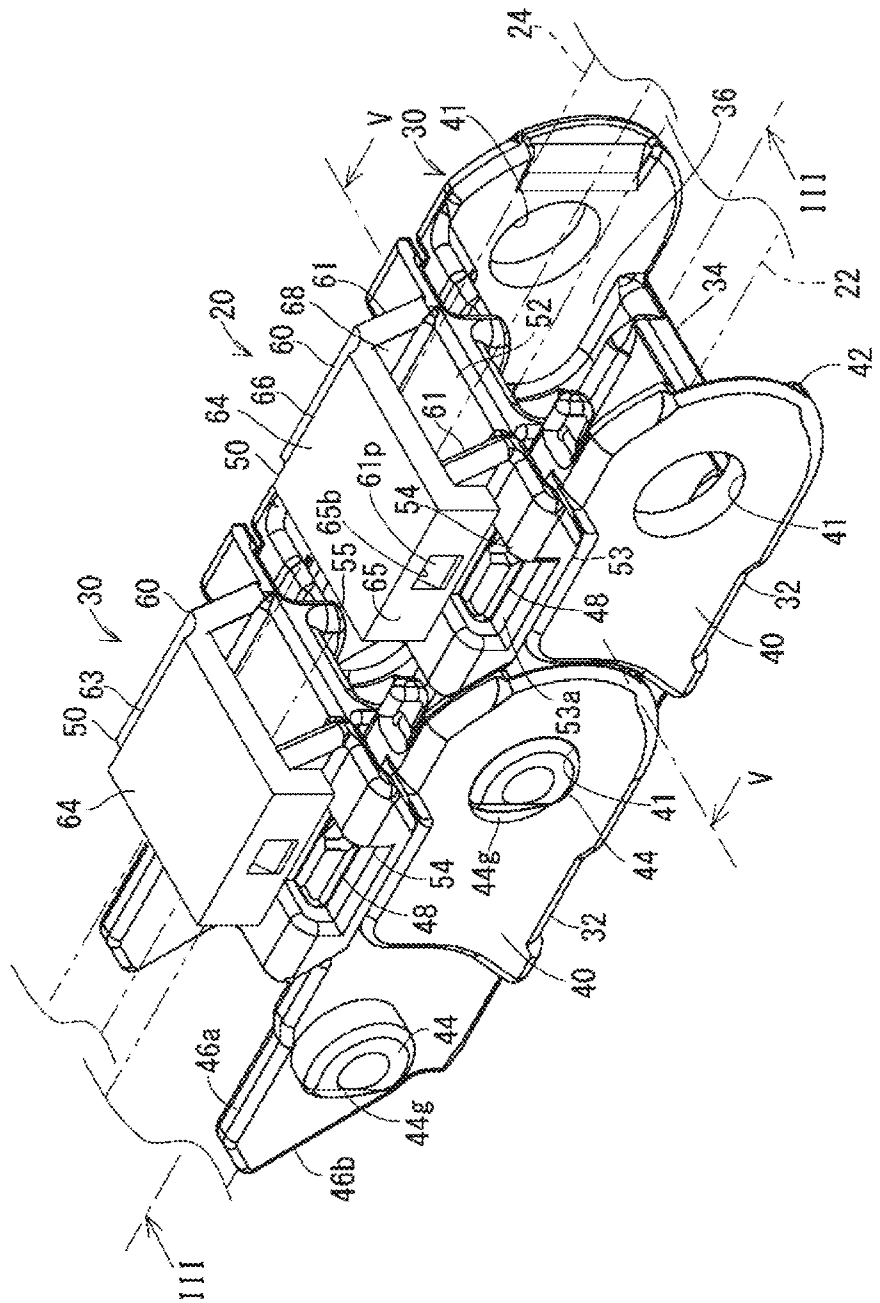
FIG. 2 is a perspective view showing part of the path regulating wire harness.
Figure 3:
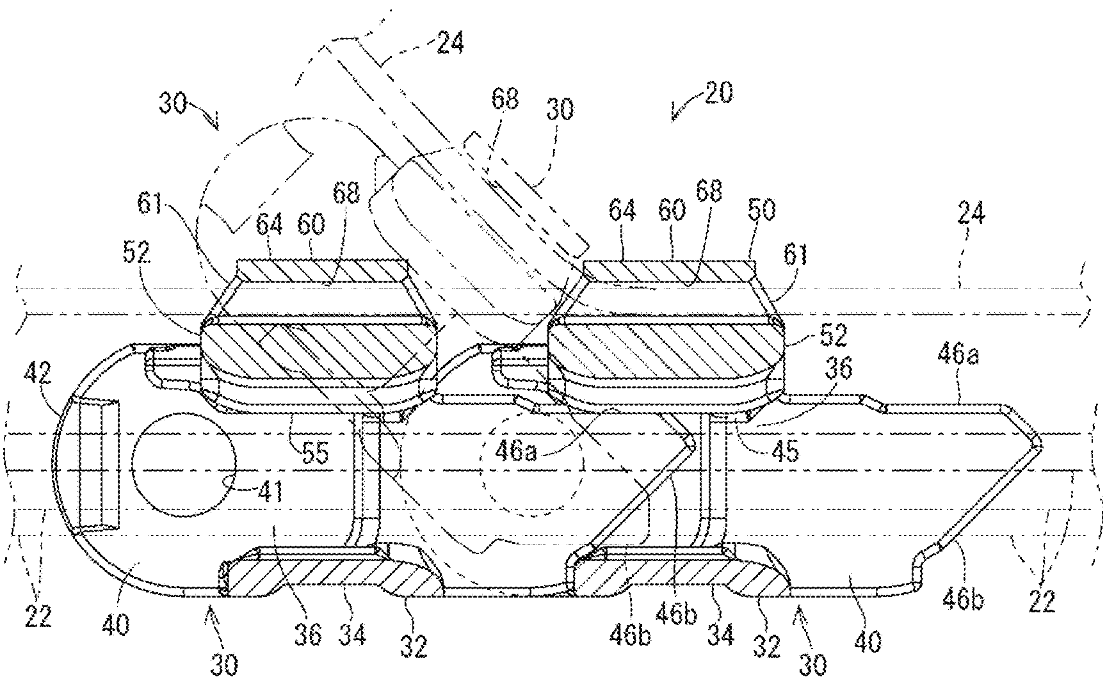
FIG. 3 is a cross-sectional view taken along line III-III in FIG. 2.

FIG. 2 is a perspective view showing part of the path regulating wire harness 20, and FIG. 3 is a cross-sectional view taken along line III-III in FIG. 2. In FIG. 3, a state in which wire movable path regulating components 30 that are coupled together move rotationally is indicated by two-dot chain lines.

As shown in FIGS. 1 to 3, the path regulating wire harness 20 is provided with a plurality of wire movable path regulating components 30, at least one first wire 22, and at least one second wire 24. A plurality of first wires 22 are shown as one bundle in FIG. 2.

The plurality of wire movable path regulating components 30 are coupled together in a row in such a manner as to be rotationally movable relative to each other. In the present embodiment, adjacent wire movable path regulating components 30 are coupled together in such a manner as to be rotationally movable about one axis. The adjacent wire movable path regulating components are thus restricted from rotationally moving about a different axis from the one axis. As a result of the plurality of wire movable path regulating components 30 being coupled in such a manner as to be rotationally movable about axes parallel to the one axis, the plurality of wire movable path regulating components 30 are coupled so as to be able to bend in one plane, and bending in a direction away from the one plane is inhibited.

Also, the rotational movement range of the adjacent wire movable path regulating components 30 about the one axis is regulated. The bending direction and bending range of the plurality of wire movable path regulating components 30 are thereby regulated in the one plane. The configuration for regulating this rotational movement range will be described later.

The wire movable path regulating components 30 each include a first wire housing space 36 and a second wire housing space 68. The first wire housing space 36 and the second wire housing space 68 are adjacent to each other in a partitioned state.

The first wire 22 is a wiring member that electrically connects an electrical component on the vehicle body main body 10 side with an electrical component on the sliding door 14 side. One first wire 22 or a plurality of first wires 22 may be provided. The second wire 24 is a wiring member that electrically connects an electrical component on the vehicle body main body 10 side with an electrical component on the sliding door 14 side. One second wire 24 or a plurality of second wires 24 may be provided. The first wire 22 has, for example, a core wire 22*a* and an insulating coating 22*b* that covers the core wire 22*a*. The second wire 24 includes, for example, a core wire 24*a* and an insulating coating 24*b* that covers the core wire 24*a*. The first wire 22 and the second wire 24 extend between the vehicle body main body 10 and the sliding door 14 and are connected to respective electrical components thereof.

The first wire 22 is, for example, envisaged to be a wiring material for connecting installed electrical components at the basic design stage of a vehicle. The second wire 24 is, for example, envisaged to be a wiring material that is connected to an electrical component added due to retrofitting or the like after the basic design stage of the vehicle. The number of second wires 24 is thus envisaged to be fewer than the number of first wires 22.

The first wire 22 is passed through and housed in the respective first wire housing spaces 36 of the plurality of wire movable path regulating components 30 that are arranged successively in a row. The second wire 24 is passed through and housed in the respective second wire housing spaces 68 of the plurality of wire movable path regulating components 30 that are arranged successively in a row. The paths of the first wire 22 and the second wire 24 are thus regulated within the separate spaces 36 and 68 of the plurality of wire movable path regulating components 30, while remaining in parallel.

The first wire 22 and the second wire 24 may be signal cables or power cables. A plurality of first wires 22 may be bundled in the form of a twisted wire or may be bundled in a state of being covered by a sheath. Similarly, a plurality of second wires 24 may be bundled by being twisted together or covered with a sheath. The first wire 22 and the second wire 24 may also include a coaxial cable.

Regarding Wire Movable Path Regulating Component

Figure 4:
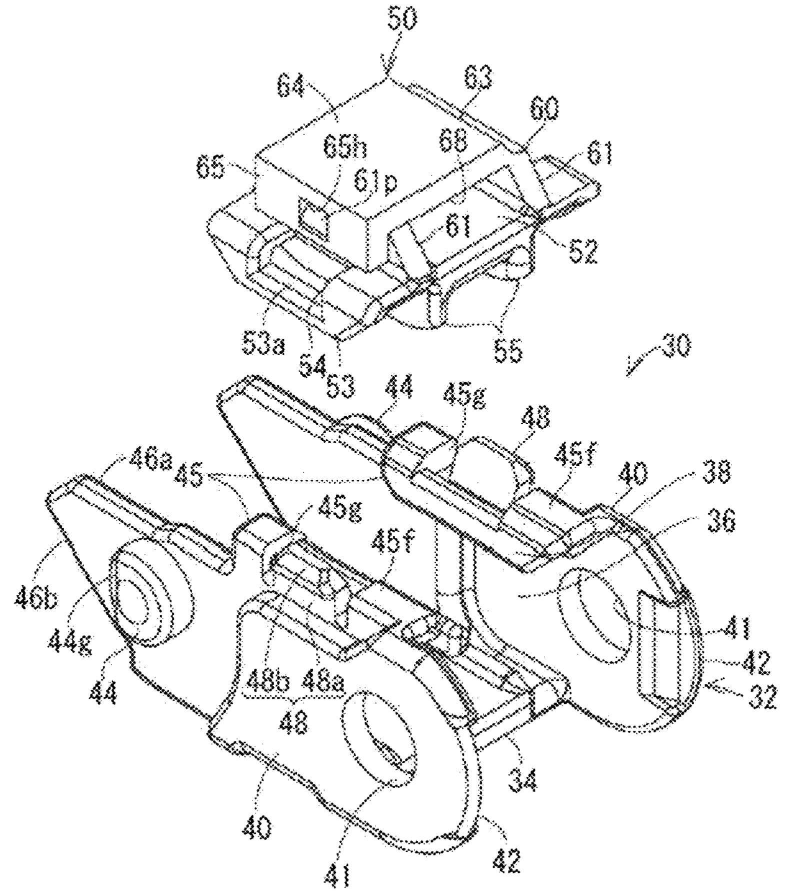
FIG. 4 is an exploded perspective view showing a wire movable path regulating component.
Figure 5:
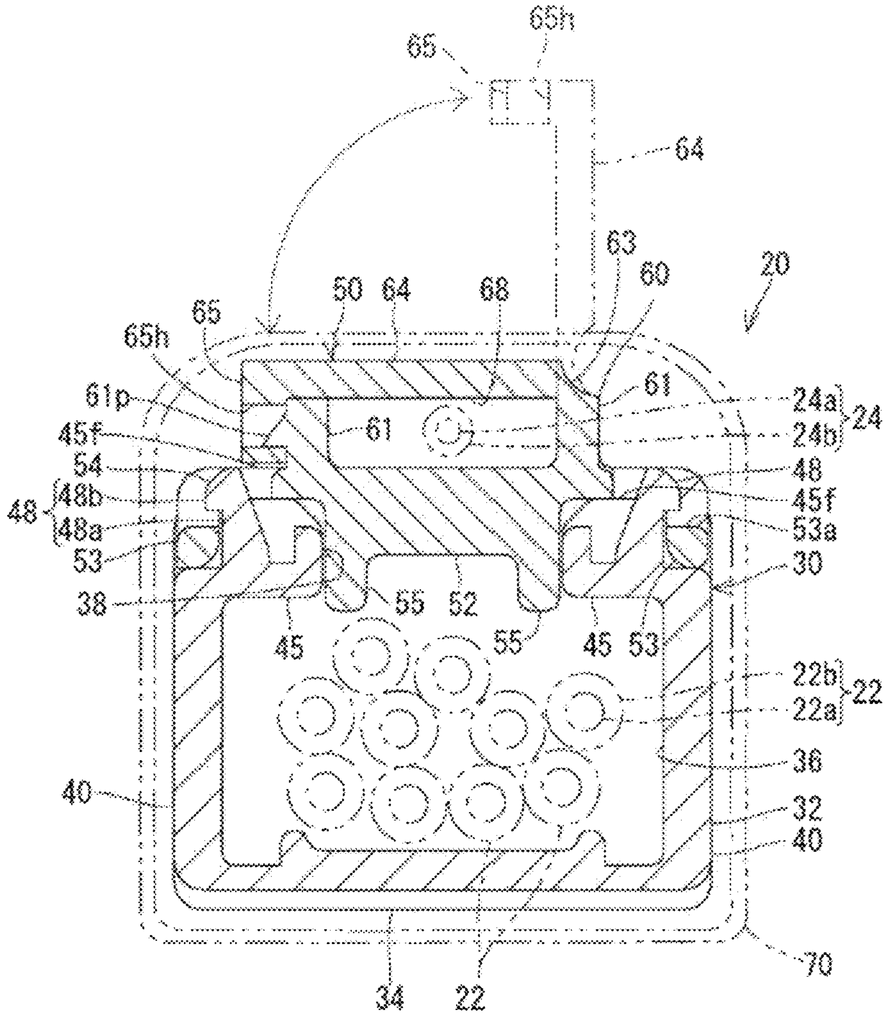
FIG. 5 is a cross-sectional view taken along line V-V in FIG. 2 showing the wire movable path regulating component.

The wire movable path regulating component 30 will now be described. FIG. 4 is an exploded perspective view showing the wire movable path regulating component 30. FIG. 5 is taken along line V-V in FIG. 2 showing the wire movable path regulating component 30.

As shown in FIGS. 2 to 5, the wire movable path regulating component 30 is provided with a main body component 32 (main body) and an attachment component 50 (attachment). The main body component 32 and the attachment component 50 are, for example, components that are separately molded from resin.

The main body component 32 is coupled in a rotationally movable manner to the main body component 32 of another wire movable path regulating component 30. The main body component 32 has a housing opening 38 and the first wire housing space 36. The housing opening 38 is an opening through which the first wire 22 is housed within the main body component 32. The first wire housing space 36 is a space for housing the first wire 22 in a state of passing therethrough inside the housing opening 38.

More specifically, the main body component 32 is a component integrally molded from resin and is provided with a bottom piece 34 and a pair of side pieces 40.

The side pieces 40 are formed in an elongated plate shape. A coupling recessed part 41 is formed at one longitudinal end portion of each side piece 40. In the present embodiment, the coupling recessed part 41 is a round through hole. The outer peripheral edge of the one longitudinal end portion of each side piece 40 is formed as an arc-shaped edge 42 that projects outward.

A coupling protruding part 44 is formed on the outward-facing surface of the other longitudinal end portion of each side piece 40. In the present embodiment, the coupling protruding part 44 is a short cylindrical protrusion. The coupling protruding parts 44 of the other longitudinal end portions of the pair of side pieces 40 are fitted into the coupling recessed parts 41 of the one longitudinal end portions of another pair of side pieces 40. A plurality of adjacent main body components 32 are thereby coupled in such a manner as to be rotationally movable about a central axis of the pair of coupling protruding parts 44.

A portion of the distal end surface of the coupling protruding part 44 toward the other longitudinal end portion of each side piece 40 is formed as a guide surface 44*g* that reduces the protruding length of the coupling protruding part 44 proceeding toward the other longitudinal end portion of the side piece 40. The one end portion of each side piece 40 can thus readily ride up onto the coupling protruding part 44 of another side piece 40, utilizing the guide surface 44*g* of the coupling protruding part 44. The coupling protruding part 44 can thereby be readily fitted into the coupling recessed part 41.

The outward-facing surface of the other longitudinal end portion of each side piece 40 is more recessed than the outward-facing surface of the one longitudinal end portion of the side piece 40. The difference in level between outer surface of the one end portion of one side piece 40 and the outer surface of the one end portion of another side piece 40 can thereby be reduced, in a state where the other end portion of the one side piece 40 is overlapped with the outer surface of the one end portion of the other side piece 40.

The outer peripheral edge of the other longitudinal end portion of each side piece 40 is formed in a shape that regulates the rotational movement range relative to another side piece 40. In the present embodiment, the outer peripheral edge of the other longitudinal end portion of the side piece 40 has a first regulating edge 46*a* that extends in the longitudinal direction of the side piece 40 and a second regulating edge 46*b* that inclines relative to the longitudinal direction of the side piece 40. The first regulating edge 46*a* and the second regulating edge 46*b* face in opposite directions to each other.

Two side pieces 40 are coupled together as a result of the coupling protruding part 44 being fitted into the coupling recessed part 41. In a state where the two side pieces 40 extend in a straight line, the first regulating edge 46*a* of one side piece 40 contacts an inward-facing protruding part 45 of the other side piece 40 (state indicated by a solid line in FIG. 3). In a state where the two side pieces 40 have rotationally moved relative to each other, the second regulating edge 46*b* of the one side piece 40 contacts the bottom piece 34 of the other side piece 40 (state indicated by a two-dot chain line in FIG. 3). The rotational movement range of the two side pieces 40 is thus restricted to the range over which the two regulating edges 46*a* and 46*b* of the one side piece 40 contact the inward-facing protruding part 45 or the bottom piece 34 of the other side piece 40.

The shapes of the first regulating edge 46*a* and the second regulating edge 46*b* are set as appropriate, according to the rotational movement range required between adjacent side pieces 40.

The bottom piece 34 is coupled to one side edge of each of the pair of side pieces 40. The first wire housing space 36 is the space enclosed by the bottom piece 34 and the pair of side pieces 40. The first wire housing space 36 is open on both longitudinal sides of the side pieces 40. The direction in which the first wire 22 passes through the two openings of the first wire housing space 36 is a through direction of the first wire housing space 36. This through direction coincides with the longitudinal direction of the side pieces 40. The first wire 22 can be housed in a state of passing through the first wire housing space 36 in such as manner as to extend on both longitudinal sides of the side pieces 40. The first wire housing space 36 is also open on the opposite side to the bottom piece 34. This opening is the housing opening 38 through which the first wire 22 is housed. The first wire housing space 36 is located on the bottom piece 34 side of the housing opening 38, that is, inside the housing opening 38. The first wire 22 is housed in a state of passing through the first wire housing space 36 via the housing opening 38.

The inward-facing protruding part 45 protruding toward the widthwise center of the pair of side pieces 40 is formed on the other side edge of each of the pair of side pieces 40. The inward-facing protruding part 45 is formed in a longitudinally intermediate portion of the other side edge of each of the pair of side pieces 40. There is a gap between distal end portions of the pair of inward-facing protruding parts 45. The gap is set to a size that allows the first wire 22 to pass through.

The first regulating edges 46*a* are able to contact the inward-facing protruding parts 45. The surfaces of the inward-facing protruding parts 45 on the opposite side to the bottom piece 34 are formed on support surfaces 45*f* that extend in the longitudinal direction of the side pieces 40 and in a direction orthogonal to the side pieces 40. The attachment component 50 is stably supported on the support surfaces 45*f*.

The main body component 32 has a lock protruding part 48 as a locking part located on both side portions of the housing opening 38. Here, a long hole part 45*g* is formed in the longitudinal direction of each side piece 40 in a longitudinally intermediate portion of the inward-facing protruding part 45. The lock protruding part 48 serving as a locking part protrudes through the hole part 45*g* from the other side edge of the side piece 40. The lock protruding part 48 has a plate part 48*a* that protrudes outward in the width direction of the side piece 40 and a protruding part 48*b* that protrudes in the thickness direction of the plate part 48*a* from a distal end portion of the plate part 48*a*. The plate part 48*a* is formed at an interval to the inner peripheral surface of the hole part 45*g* and can elastically deform within the hole part 45*g*. The protruding parts 48*b* protrude outward of the pair of side pieces 40. The distal end portion of each protruding part 48*b* is formed as a guide surface 48*g* that gradually decreases in height toward the distal end portion of the plate part 48*a*.

The attachment component 50 is a separate component from the main body component 32. In the present embodiment, the entire attachment component 50 is integrally molded using the same resin. Also, the attachment component 50 is a component attached to the main body component 32. The attachment component 50 has a cover main body part 52 (cover main body) and an additional enclosing part 60.

The cover main body part 52 includes a plate-shaped portion that blocks the housing opening 38. The cover main body part 52 is not required to block the entire housing opening 38 and need only block the housing opening 38 to the extent that the first wire 22 is prevented from coming out through the housing opening 38. In the present embodiment, the cover main body part 52 blocks the portion of the housing opening 38 where the inward-facing protruding parts 45 are provided.

More specifically, the cover main body part 52 includes a rectangular plate-shaped portion. The width of the cover main body part 52 is set to be larger than the interval between the pair of side pieces 40. The length of the cover main body part 52 is set to be long enough to be able to cover the inward-facing protruding parts 45. The cover main body part 52 is able to cover the housing opening 38, when placed on the support surfaces **45*f* of the pair of inward-facing protruding parts 45**.

The cover main body part 52 has a positioning auxiliary protruding part 53 that extends over the outward-facing surface of the other side edge of each of the pair of side pieces 40. Positioning of the cover main body part 52 in the width direction is performed as a result of the pair of positioning auxiliary protruding parts 53 contacting the outward-facing surfaces of the pair of side pieces 40 in a state where the cover main body part 52 is blocking the housing opening 38.

The cover main body part 52 has locking hole parts 54 as lock-receiving parts that the lock protruding parts 48 latch to. In the present embodiment, the locking hole parts 54 are formed in corner portions of the cover main body part 52 that extend from the portions that are placed on the support surfaces **45*f* to the positioning auxiliary protruding parts 53. Edge portions 53*a* of the locking hole parts 54 formed in the positioning auxiliary protruding parts 53 face in the protruding direction of the lock protruding parts 48. The cover main body part 52 is thus locked so as to not separate from the other side edges of the side pieces 40, as a result of the protruding parts 48*b* of the lock protruding parts 48 latching to the edge portions 53*a***.

The locking hole parts 54 also extend to the portions of the cover main body part 52 that are placed on the support surfaces **45*f*. The lock protruding parts 48 are able to elastically deform in the thickness direction of the plate parts 48*a*, utilizing the portions of the locking hole parts 54 that extend over the support surfaces 45*f***.

The attachment component 50 is attached to the main body component 32, as a result of the pair of lock protruding parts 48 latching to the pair of locking hole parts 54 in a retained manner. Note that locking hole parts may be formed in the main body component, and lock protruding parts may be formed on the attachment component.

The cover main body part 52 has a pair of auxiliary pieces 55 that extend toward the bottom piece 34, inward of the distal end portions of the inward-facing protruding parts 45. Looseness of the cover main body part 52 with respect to the main body component 32 is suppressed, as a result of the pair of auxiliary pieces 55 contacting the distal end portions of the inward-facing protruding parts 45, in a state where the attachment component 50 is attached to the main body component 32.

The additional enclosing part 60 is a portion that forms the second wire housing space 68 for housing the second wire 24 in a state of passing therethrough. The second wire housing space 68 is a space partitioned from the first wire housing space 36 by the cover main body part 52.

The additional enclosing part 60 includes an additional cover part 64 that is openable and closable between a state in which the second wire housing space 68 is enclosed and an open state in which at least part of the second wire housing space 68 is open.

In the present embodiment, the additional enclosing part 60 has a pair of additional sidewall parts 61 and the additional cover part 64.

The pair of additional sidewall parts 61 are located inward of the pair of locking hole parts 54. The pair of additional sidewall parts 61 have a long plate shape in the longitudinal direction of the side pieces 40 and protrude on the opposite side to the main body component 32 with respect to the cover main body part 52. The longitudinal dimension of the additional sidewall parts 61 is formed so as to gradually decreases proceeding away from the cover main body part 52.

The additional cover part 64 joins the distal end portions of the pair of additional sidewall parts 61 at a position spaced away from the cover main body part 52. In the present embodiment, the additional cover part 64 has a square plate shape. The width of the additional cover part 64 is greater than the interval between the pair of additional sidewall parts 61. The length of the additional cover part 64 in the longitudinal direction of the additional sidewall parts 61 is set to a size that depends on the length of the distal end portions of the additional sidewall parts 61.

Note that it is not essential for the additional cover part 64 to have a square plate shape. The additional cover part may, for example, have a U plate shape or a V plate shape that projects outward as viewed in the longitudinal direction of the additional sidewall parts 61.

The distal end portion of one of the pair of additional sidewall parts 61 and one side portion of the additional cover part 64 are coupled together by a hinge part 63. The additional cover part 64 is swingably supported on one side thereof by this hinge part 63.

In the present embodiment, the hinge part 63 is a thin hinge formed to be thinner than a pair of adjacent portions that are continuous with the hinge part 63. In the present embodiment, the pair of adjacent parts that are continuous with the hinge part 63 are the one additional sidewall part 61 and the one side portion of the additional cover part 64, and the hinge part 63 is formed to be thinner than these portions.

The thin hinge is a portion that is integrally molded together with the additional sidewall part 61 and the additional cover part 64. Therefore, the additional cover part 64 can be readily integrally molded using the same resin, together with portions of the attachment component 50 other than the additional cover part 64.

It is not essential for the above configuration to include the hinge part 63. For example, a configuration may be adopted for the hinge part in which a pin-shaped shaft part that protrudes on the one additional sidewall part 61 or the one side portion of the additional cover part 64 fits in a recessed part formed in the other thereof in such a manner as to be rotationally movable. The additional cover part 64 may then be openable and closable, as a result of the shaft part rotationally moving within the recessed part.

An additional cover locking part 65 is provided on the other side of the additional cover part 64. The attachment component 50 has an additional cover receiving-side locking part **61*p* capable of latching the additional cover locking part 65**.

In the present embodiment, the additional cover locking part 65 is formed in a plate shape extending from the other side portion of the additional cover part 64 along the outer surface of the other additional sidewall part 61 toward a base end portion thereof. A latching hole 65*h* in which the additional cover receiving-side locking part 61*p* latches is formed in the additional cover locking part 65.

The additional cover receiving-side locking part 61*p* is a protruding part for latching that protrudes on the outer surface of the other additional sidewall part 61. The additional cover receiving-side locking part 61*p* is formed in a shape in which the protruding length gradually decreases proceeding toward the distal end side of the additional sidewall part 61.

When closing the additional cover part 64 by rotationally moving the additional cover part 64 about the hinge part 63, the additional cover locking part 65 faces the base end side along the other additional sidewall part 61. The distal end edge of the additional cover locking part 65 contacts the inclined surface of the additional cover receiving-side locking part 61*p*, and either the other additional sidewall part 61 elastically deforms inward or the additional cover locking part 65 elastically deforms outward. The additional cover receiving-side locking part 61*p* latches in the latching hole 65*h*, utilizing this elastic deformation. The additional cover part 64 is thereby kept closed.

Note that a latching protrusion may be formed on the other side of the additional cover part 64, and a latching hole may be formed in the other additional sidewall part 61.

Note that it is not essential for the additional cover part 64 to be supported in such a manner as to be openable and closable with respect to the cover main body part 52. For example, the additional cover part may be supported in such a manner as to be openable and closable with respect to the cover main body part via a hinge part. In this case, in order to form a recess for housing the second wire in the additional cover part, the additional cover part may have sidewall parts that correspond to the additional sidewall parts 61. Therefore, it is not essential for the additional sidewall parts 61 to be integrally formed on the cover main body part 52. In other words, the entire additional enclosing part may be an additional cover part.

The additional cover part 64 may also be a separate component from the cover main body part 52. For example, a portion corresponding to the additional cover part 64 and the pair of additional sidewall parts 61 may be a component integrally molded using the same resin, or alternatively, a portion corresponding to the additional cover part 64 may be a component integrally molded using the same resin. In this case, both side portions of the portion corresponding to the additional cover part 64 may be latched to portions corresponding to the pair of additional sidewall parts 61, by a configuration similar to the above latching configuration.

The additional enclosing part 60 is formed in a position where the additional enclosing part 60 is moldable inward of the pair of locking hole parts 54. In the present embodiment, the additional cover part 64 is located on the distal end side extension of the one additional sidewall part 61, in a state where the additional cover part 64 is open. In this configuration, the pair of additional sidewall parts 61 and the additional cover part 64 can be molded inward of the pair of locking hole parts 54.

The space enclosed by the cover main body part 52, the pair of additional sidewall parts 61, and the additional cover part 64 is the second wire housing space 68 that houses the second wire 24. The second wire housing space 68 is open on both sides in the longitudinal direction of the pair of additional sidewall parts 61. The through direction of the second wire housing space 68 coincides with the longitudinal direction of the side pieces 40. The second wire 24 is housed within the second wire housing space 68 in a state of passing therethrough in the longitudinal direction of the side pieces 40 and the pair of additional sidewall parts 61. The second wire housing space 68 is partitioned from the first wire housing space 36 by the cover main body part 52.

The first wire 22 is thus housed within the first wire housing space 36, and, separately thereto, the second wire 24 is housed within the second wire housing space 68. The first wire 22 is inhibited from entering the second wire housing space 68 and the second wire 24 is inhibited from entering the first wire housing space 36.

As described above, there are envisaged to be fewer second wires 24 than first wires 22. The second wire housing space 68 may thus be smaller than the first wire housing space 36, as viewed in the longitudinal direction of the first wire 22 and the second wire 24. The smaller number of second wires 24 can thereby be housed inside a smaller space, and the larger number of first wires 22 can be housed inside a larger housing space.

Although the materials of the main body component 32 and the attachment component 50 are not particularly limited, the main body component 32 may be more rigid than the attachment component 50. Here, which of the two components is more rigid (or more flexible) may be evaluated using values obtained by a hardness test according to ISO/TS 19278:2019, for example. For example, the main body component 32 may be made of polyamide 66 (PA66) and the attachment component 50 may be made of polypropylene (PP). The main body component 32 may contain glass fibers.

If the main body component 32 is rigid, the wire movable path regulating components 30 are unlikely to uncouple from each other, and the rotational movement range between the wire movable path regulating components 30 is tightly regulated. The path of the path regulating wire harness 20 is thus tightly regulated. The task of latching the lock protruding parts 48 to the locking hole parts 54 and the task of latching the additional cover receiving-side locking part 61*p* to the latching hole 65*h* can be readily performed, utilizing the flexibility of the attachment component 50.

The attachment component 50 has regulating shape plane symmetry with respect to a surface orthogonal to the width direction thereof. Also, the attachment component 50 has regulating shape plane symmetry with respect to a surface orthogonal to the through direction of the second wire housing space 68.

Note that, here, regulating shape plane symmetry means having plane symmetry in relation to shapes for regulating the path of the wires 22 and 24; that is, the attachment component 50 has plane symmetry in relation to regulating surfaces that keep the first wire 22 and the second wire 24 within a predetermined range (e.g., surfaces defining first wire housing space 36 or second wire housing space 68) and in relation to functional portions that relate to regulating the range over which the wire movable path regulating component 30 rotationally moves. Thus, for example, the hinge part 63, the additional cover locking part 65, and the additional cover receiving-side locking part 61*p* are not regulating surfaces that keep the wires 22 and 24 within a predetermined range, and need not have plane symmetry due to not affecting regulation of the rotational movement range. The attachment component 50 need also not have plane symmetry in relation to design-related shape portions thereof that do not affect the regulating surfaces or functions In the present embodiment, the inner surface of the cover main body part 52 regulates the housing range of the first wire 22 as part of the surface defining the first wire housing space 36. Also, the widthwise center portion of the outer surface of the cover main body part 52, the inner surfaces of the pair of additional sidewall parts 61, and the inward-facing surface of the additional cover part 64 define the second wire housing space 68. These surfaces are formed in a bilaterally symmetrical shape in the width direction. Also, these surfaces are formed in a symmetrical shape in the front-back direction, which is the through direction of the second wire housing space 68.

Also, the adjacent attachment components 50 are set so as to not contact each other, in a state where the adjacent wire movable path regulating components 30 are bent.

In this way, the attachment component 50 according to the present embodiment has regulating shape plane symmetry in the left-right direction and the front-back direction. Thus, even if the attachment orientation of the attachment component 50 is changed left to right, the housing range of the first wire 22 regulated by the first wire housing space 36 and the housing range of the second wire 24 regulated by the second wire housing space 68 do not change. Also, the rotational movement range of adjacent wire movable path regulating components 30 does not change. Therefore, even if the attachment orientation of the attachment component 50 with respect to the main body component 32 is changed left to right, the paths of the first wire 22 and the second wire 24 can thus be regulated in the same manner.

The path regulating wire harness 20 is, for example, manufactured as follows.

First, a plurality of wire movable path regulating components 30 are coupled together in a row. In this state, the first wire housing spaces 36 of the wire movable path regulating components 30 are disposed so as to be aligned in a row. Also, the first wire housing spaces 36 are open via the housing openings 38. The housing openings 38 are also aligned in a row.

The first wire 22 is disposed between the pairs of side pieces 40 through the housing openings 38. Next, pairs of lock protruding parts 48 are inserted into the pairs of locking hole parts 54, and the protruding parts 48*b* are latched to the locking hole parts 54. The attachment components 50 are thereby attached to the main body components 32, in a state where the cover main body parts 52 block the housing openings 38. In this state, the first wire 22 is kept in a state of being housed within the first wire housing spaces 36 aligned in a row.

In the state after the attachment of the attachment components 50, a plurality of hinge parts 63 may be disposed so as to be aligned in a row to one side of the main body components 32. In this case, the plurality of additional cover parts 64 need only be closed by being rotationally moved in the same direction in the next step, and thus the task of closing the plurality of additional cover parts 64 is readily performed. Hinge parts 63 located to one side of the main body component 32 and hinge parts 63 located to the other side may be used together. In the state after the attachment components 50 are attached to the main body components 32, the additional cover receiving-side locking parts 61*p* are not engaged in the latching holes 65*h*, and the additional cover parts 64 are in an open state.

Next, the second wire 24 is disposed between the pairs of additional sidewall parts 61. Thereafter, the additional cover parts 64 are closed, and the additional cover receiving-side locking parts 61*p* engage the latching holes 65*h*. The second wire 24 is thereby kept in a state of being housed within the second wire housing spaces 68 aligned in a row.

The second wire 24 need only be arranged on the cover main body parts 52 in a state where the additional cover parts 64 are open, and thereafter the additional cover parts 64 need only be closed. Thus, the second wire 24 does not need to be passed through the second wire housing spaces 68. The task of holding the second wire 24 can thereby be readily performed.

Note that the plurality of wire movable path regulating components 30 coupled together in a row may be covered by an exterior member 70 formed in a cylindrical shape and made of rubber or the like (see FIGS. 1 and 5). The exterior member may, for example, be a member also known as a rubber boot.

Operations of Path Regulating Wire Harness

Example operations of the path regulating wire harness 20 will now be described.

The path regulating wire harness 20 is arranged so as to extend between the vehicle body main body 10 and the sliding door 14. In this state, the wire movable path regulating component 30 at one end of the plurality of wire movable path regulating components 30 coupled together in a row is coupled to the vehicle body main body 10. The wire movable path regulating component 30 at the other end of the plurality of wire movable path regulating components 30 is coupled to the sliding door 14. The plurality of wire movable path regulating components 30 thereby move so as to bend following the opening and closing operation of the sliding door 14. Between adjacent wire movable path regulating components 30, the pairs of coupling protruding parts 44 are regulated to rotationally moving about the axis thereof. Also, the rotational movement range of adjacent wire movable path regulating components 30 is regulated by the shapes of the first regulating edges 46*a* and the second regulating edges 46*b*. The path of the plurality of wire movable path regulating components 30 is thus regulated so as to bend in a bending form set in advance.

The first wire 22 and the second wire 24 are able to bend while the paths thereof are regulated by the plurality of wire movable path regulating components with opening and closing of the sliding door 14. At this time, the path of the first wire 22 is regulated by the plurality of first wire housing spaces 36 that are arranged successively in a row. The path of the second wire 24 is regulated by the plurality of second wire housing spaces 68 that are arranged successively in a row next to the first wire 22.

Supposing that the first wire housing space 36 and the second wire housing space 68 were continuous with each other, the first wire 22 could possibly move to the second wire housing space 68 side, and the second wire 24 could possibly move into the first wire housing space 36 side. In that case, the degree of freedom in the positions of the first wire 22 and the second wire 24 in the wire movable path regulating component 30 increases. This leads to instability such as the first wire 22 being located on the outer peripheral side or the second wire 24 is located on the inner peripheral side, in a state where the path regulating wire harness 20 is bent. As such, the path lengths of the first wire 22 and the second wire 24 could possibly change greatly in response to changes in the path of the path regulating wire harness 20.

In the present embodiment, the path of the first wire 22 is regulated by the first wire housing space 36, and the path of the second wire 24 is regulated by the second wire housing space 68 next to the first wire 22. Therefore, the paths of the first wire 22 and the second wire 24 are regulated in limited areas, compared to the case where the first wire housing space 36 and the second wire housing space 68 are continuous with each other. Changes in the path lengths of the first wire 22 and the second wire 24 due to changes in the path of the path regulating wire harness 20 can thus be reduced.

The required lengths of the first wire 22 and the second wire 24 are thus easy to predict. The ways in which the first wire 22 and the second wire 24 will bend inside the path regulating wire harness 20 are also easy to predict. The bending capacity of the first wire 22 and the second wire 24 is thus easy to predict. Note that the bending capacity can be evaluated by the number of bends or the like until the first wire 22 and the second wire 24 break, in the case where repeated bending is performed under the condition that the path is regulated by the wire movable path regulating components 30.

Utilization Example

The path regulating wire harness 20 can, for example, be utilized in situations such as the following.

For example, assume that, in the basic design, a path regulating wire harness that includes at least one first wire 22 and does not include a second wire 24 is designed. The basic design is, for example, a design relating to an initial model of a vehicle. In the basic design, an electrical component incorporated into the sliding door 14 is set. As a path regulating wire harness that corresponds to the basic design, path design for regulating bending of the path of the first wire 22 connected to the electrical component incorporated in the sliding door 14 is carried out. This path regulating wire harness employs a wire movable path regulating component that omits the additional enclosing part 60 of the path regulating wire harness 20.

Assume that, thereafter, additional design for adding an electrical component to the sliding door 14 is carried out. In this case, path regulation will be performed with the addition of the second wire 24 that is connected to the additional electrical component. The first wire housing space 36 is designed to regulate the path of the first wire 22 in the basic design. Thus, there could possibly be no space left in the first wire housing space 36 for housing the second wire 24. Also, if the second wire 24 is added to the first wire housing space 36, the behavior of the first wire 22 in the first wire housing space 36 will change, and the bending capacity of the first wire 22 could possibly change.

In view of this, as described above, the attachment component 50 to which the additional enclosing part 60 is added is set. The attachment component 50 having the additional enclosing part 60 is attached to the main body component 32, instead of the attachment component employed in the basic design. The main body component 32 is the same as the main body component 32 in the basic design.

In this case, the path of the first wire 22 is regulated in a similar manner to the basic design. Thus, the bending capacity of the second wire 24 need only be predicted. Since the path of the second wire 24 is regulated within the second wire housing space 68 partitioned from the first wire housing space 36, the bending behavior of the second wire 24 is stable, and there is also little fluctuation in path length following bending. The bending capacity due to addition the second wire 24 can thus be readily predicted.

Effects and Related Matters

According to the wire movable path regulating component 30 and the path regulating wire harness 20 constituted as described above, even if the second wire 24 is added to a path regulating wire harness that is based on a basic design, the path of the first wire 22 is regulated within the first wire housing space 36 that is based on the basic design. Addition of the second wire 24 is thus unlikely to affect the movement of the first wire 22. Also, the path of the second wire 24 is regulated within the second wire housing space 68 partitioned from the first wire housing space 36. Since the path of the first wire 22 is regulated within the first wire housing space 36 and the path of the second wire 24 is regulated within the second wire housing space 68, the ranges of the first wire 22 and the second wire 24 at the time of changing the paths are limited. Changes in the path lengths of the first wire 22 and the second wire 24 in response to changes in the paths thereof are thus reduced. Variation in the loads acting on the first wire 22 and the second wire 24 when the paths of the first wire 22 and the second wire 24 change is thereby reduced. As a result, the bending capacities of the first wire 22 and the second wire 24 are readily predicted.

Also, since the additional cover part 64 is openable and closable, it is not necessary to initially pass the wire 22 through the second wire housing space 68. The task of holding the second wire 24 is thereby facilitated. Also, tasks such as attaching a connector to the second wire 24 in advance or bundling a plurality of second wires can be implemented beforehand. In the state before the second wire 24 is held by the wire movable path regulating component 30, it is also easy to provisionally bundle a plurality of second wires automatically using automated equipment.

Also, because the mold of the main body component 32 for the basic design can be used, it is not necessary to make a new mold. Design is also facilitated because the additional enclosing part 60 need only be added to the shape of the cover main body part 52 for the basic design.

Also, the additional cover part 64 is swingably supported on one side thereof. The additional cover part 64 is maintained in a closed state, as a result of the additional cover receiving-side locking part 61*p* latching to the latching hole 65*h* of the additional cover locking part 65 on the other side of the additional cover part 64. The additional cover locking part 65 can thus be readily locked to the additional cover receiving-side locking part 61*p* by rotating the additional cover part 64 about the hinge part 63 and closing the additional cover part 64. Machine operation by automated equipment readily performs the task of rotating the additional cover part 64 about the hinge part 63.

Also, when the hinge part 63 is a thin hinge, the cover main body part 52 and the additional enclosing part 60 including the additional cover part 64 can be integrally molded using the same resin. The hinge part 63 can thereby be readily formed while reducing the number of components.

Also, if the main body component 32 is more rigid than the attachment component 50, the strength of the wire movable path regulating component 30, which is preferable for path regulation and protection of the wires 22 and 24, can be secured by the more rigid main body component 32. Also, the attachment component 50, which is more flexible than the main body component 32, is suitable for forming the hinge part 63 as a structure for allowing the additional cover part 64 to be opened and closed with respect to the cover main body part 52. Also, the attachment component 50 is suitable for forming the additional cover locking part 65 and the additional cover receiving-side locking part 61*p* as a locking structure for maintaining the closed state utilizing elastic deformation.

Also, since the additional enclosing part 60 is formed at a position where it is moldable inward of the pair of locking hole parts 54, the pair of locking hole parts 54 can be readily molded when the additional enclosing part 60 is molded.

Also, the second wire 24 can be readily added as long as there are fewer second wires 24 than first wires 22. Also, the movable range of the added second wire 24 at the time of path regulation is limited, as a result of the second wire 24 being housed in the second wire housing space 68, which is smaller than the first wire housing space 36. The bending capacity of the second wire 24 is thereby readily predicted.

Also, since the attachment component 50 has regulating shape plane symmetry in both the left-right direction and the front-rear direction, the attachment component 50 can be attached to the main body component 32 without worrying about orientation.

Modification

Figure 6:
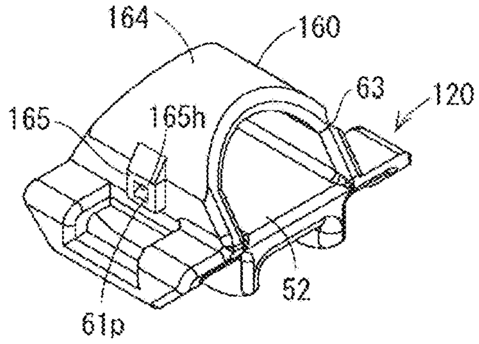
FIG. 6 is a perspective view showing an attachment component according to a modification.
Figure 7:
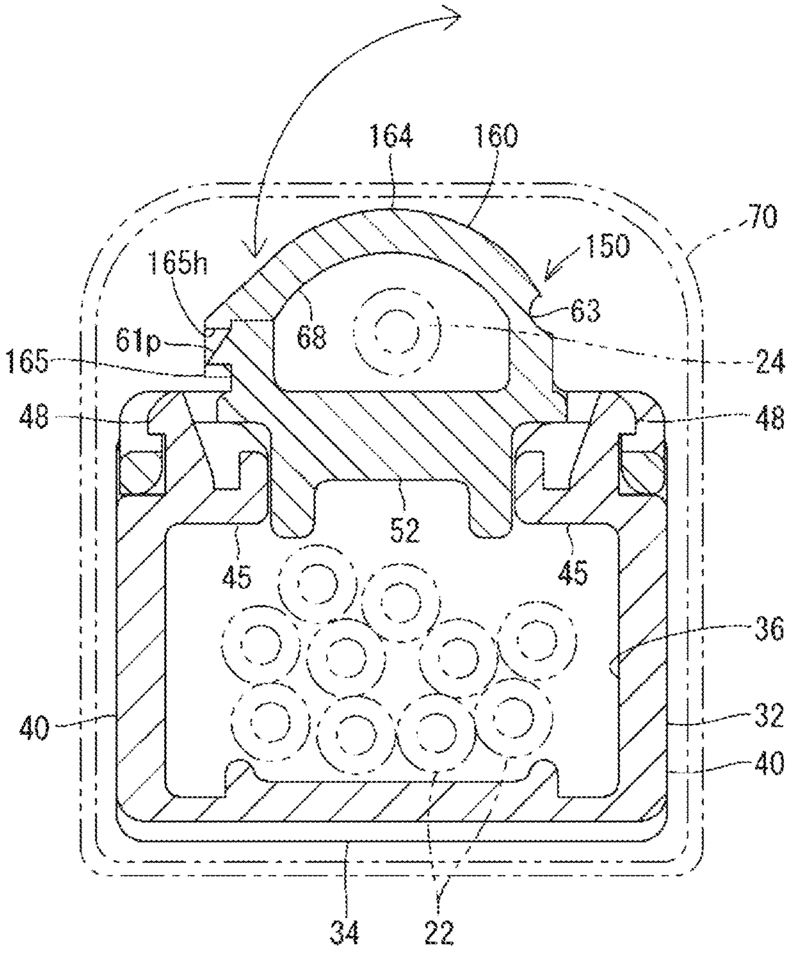
FIG. 7 is a perspective view showing a wire movable path regulating component according to the modification.

A modification will now be described premised on the above embodiment. FIG. 6 is a perspective view showing an attachment component 150 according to the modification. FIG. 7 is a cross-sectional view showing the attachment component 150 according to the modification.

In the present embodiment, an additional cover part 164 corresponding to the additional cover part 64 is disposed between the distal end portions of the pair of additional sidewall parts 61 at a position spaced away from the cover main body part 52. The additional cover part 164 is formed in a plate shape that describes an arc projecting on the opposite side to the bottom piece 34, as viewed in the longitudinal direction of the additional sidewall parts 61 (through direction of second wire housing space 68). Therefore, in the present embodiment, an additional enclosing part 160 corresponding to the additional enclosing part has a U-shape in which the pair of additional sidewall parts 61 are continuous with the two end portions of the additional cover part 164, as viewed in the longitudinal direction of the additional sidewall parts 61.

A thin hinge part 63 is formed between one side portion of the additional cover part 164 and one of the additional sidewall parts 61. The additional cover part 164 can be opened and closed by rotating about the hinge part 63. A plate-shaped additional cover locking part 165 is formed on the other side portion of the additional cover part 164, and a latching hole 165*h* is formed in this additional cover locking part 165.

Then, when the additional cover part 164 is closed, the additional cover receiving-side locking part 61*p* protruding on the outer surface of the other additional sidewall part 61 latches to the latching hole 165*h*. The additional cover part 164 is thereby kept closed.

The length of the additional enclosing part 160 in the through direction of the second wire housing space 68 is formed so as to gradually decrease proceeding away from the main body component 32. In the present modification, the pair of additional sidewall parts 61 are formed so as to gradually narrow in width proceeding away from the cover main body part 52. The additional cover part 64 is also formed so as to gradually decrease in length proceeding away from the cover main body part 52. Thus, when looking at the additional enclosing part 160 in the width direction of the cover main body part 52, the additional enclosing part 160 has a trapezoidal shape that gradually narrows in width proceeding away from the cover main body part 52.

When adjacent wire movable path regulating components 30 are rotationally moved in a direction that brings the additional enclosing parts 160 closer together, adjacent additional enclosing parts 160 thus are less likely to interfere with each other. A large rotational movement range can thereby be set for the adjacent wire movable path regulating components 30.

Also, since the portion of the additional enclosing part 160 on the opposite side to the main body component 32 has arc shape as viewed in the through direction of the second wire housing space 68, the additional enclosing part 160 is unlikely to catch on the exterior member 70, when the wire movable path regulating component 30 is covered with an exterior component such as a rubber boot. It is thus easy to cover the wire movable path regulating component 30 with the exterior member 70. Also, it is easy to maintain the second wire 24 in the widthwise center of the additional enclosing part 160.

Note that the configurations described in the above embodiment and modifications can be combined as appropriate, provided there are no mutual inconsistencies.

The invention claimed is:

1. A wire movable path regulating component for regulating a movable path of at least one first wire and at least one second wire that extend between a first component and a second component movable relative to the first component, the wire movable path regulating component comprising:

a main body configured to be coupled in a rotationally movable manner to another wire movable path regulating component; and an attachment that is a separate component from the main body and is attached to the main body, wherein:

the main body has a housing opening through which the at least one first wire is to be housed and a first wire housing space configured to house the at least one first wire in a state of passing therethrough inside the housing opening, the attachment has a cover main body that blocks the housing opening and an additional enclosing part forming a second wire housing space configured to house the at least one second wire in a state of passing therethrough, with the second wire housing space being partitioned from the first wire housing space by the cover main body, and the additional enclosing part includes an additional cover part openable and closable between a state in which the second wire housing space is enclosed and an open state in which at least part of the second wire housing space is open.

2. The wire movable path regulating component according to claim 1, wherein the attachment has:

a hinge part swingably supporting the additional cover part on one side of the additional cover part;

an additional cover locking part provided on another side of the additional cover part; and an additional cover receiving-side locking part latchable to the additional cover locking part.

3. The wire movable path regulating component according to claim 2, wherein the hinge part is formed thinner than a pair of adjacent portions continuous with the hinge part.

4. The wire movable path regulating component according to claim 1, wherein the main body is more rigid than the attachment.

5. The wire movable path regulating component according to claim 1, wherein:

the main body has a locking part located on both side portions of the housing opening, the cover main body has a lock-receiving part to which the locking part latches, and the additional enclosing part is formed at a position where the additional enclosing part is moldable inward of the lock-receiving part.

6. The wire movable path regulating component according to claim 1, wherein the first wire housing space and the second wire housing space are configured such that the at least one second wire housed within the second wire housing space is fewer in number than the at least one first wire housed within the first wire housing space.

7. The wire movable path regulating component according to claim 1, wherein the attachment has regulating shape plane symmetry with respect to both a surface orthogonal to a width direction a surface orthogonal to a through direction of the second wire housing space.

8. The wire movable path regulating component according to claim 1, wherein a length of the additional enclosing part in the through direction of the second wire housing space gradually decreases proceeding away from the main body.

9. The wire movable path regulating component according to claim 1, wherein a portion of the additional enclosing part on an opposite side to the main body is formed in an arc shape as viewed in the through direction of the second wire housing space.

10. A path regulating wire harness comprising:

the wire movable path regulating component according to claim 1;

the at least one first wire; and the at least one second wire, wherein:

the plurality of wire movable path regulating components are coupled together in a row in such a manner as to be rotationally movable relative to each other, the at least one first wire is housed in the plurality of wire movable path regulating components in a state of passing through the first wire housing space, and the at least one second wire is housed in the plurality of wire movable path regulating components in a state of passing through the second wire housing space.

* * * * *